United States Patent [19]

Chen et al.

[11] Patent Number: 5,735,945
[45] Date of Patent: Apr. 7, 1998

[54] STATIC CHARGE-SUPPRESSING RELEASE AGENT COMPOSITIONS

[75] Inventors: Jiann H. Chen, Fairport; William J. Staudenmayer, Pittsford; Muhammed Aslam, Rochester, all of N.Y.

[73] Assignee: Eastman Kodak Company, Rochester, N.Y.

[21] Appl. No.: 821,993

[22] Filed: Mar. 21, 1997

[51] Int. Cl.⁶ .................................................. C09D 183/04
[52] U.S. Cl. .......................... 106/287.14; 106/2
[58] Field of Search .................... 106/2, 287.14

[56] References Cited

U.S. PATENT DOCUMENTS

| 4,269,739 | 5/1981 | Grejsner | 252/547 |
| 5,397,384 | 3/1995 | Wisniewski | 106/8 |

*Primary Examiner*—David Brunsman
*Attorney, Agent, or Firm*—Doreen M. Wells

[57] ABSTRACT

A toner release agent composition for electrostatography comprises a polydialkoxysilane oil and a concentration of a nonionic surfactant that is effective to prevent or substantially suppress triboelectric charging of pressure and fuser members during fusion of thermoplastic toner on a receiver. The nonionic surfactant preferably comprises about 1 to 10 weight percent, more preferably about 2 to 5 weight percent, of the release agent composition.

14 Claims, No Drawings

STATIC CHARGE-SUPPRESSING RELEASE AGENT COMPOSITIONS

FIELD OF THE INVENTION

This invention relates in general to electrostatographic imaging and in particular to the fusing of toner images. More specifically, this invention relates to toner release agent compositions having improved static charge suppression characteristics.

BACKGROUND OF THE INVENTION

In a typical electrostatographic reproducing apparatus, a light image of an original to be copied is recorded in the form of an electrostatic latent image upon a photosensitive member, and the latent image is subsequently rendered visible by the application of a thermoplastic resin toner powder. The visible toner image is initially in a loose powdered form that can be easily disturbed or destroyed but is usually fixed or fused on a receiver, which may be, for example, plain paper.

In order to fuse the toner particle image onto a receiver surface permanently by heat, it is necessary to elevate the temperature of the toner particles to a point at which they coalesce and become tacky. This heating causes the toner to flow to some extent into fibers or pores on the receiver surface. Thereafter, as the toner material cools, its solidification causes it to be firmly bonded to the receiver surface.

Typically, thermoplastic resin particles are fused to the substrate by heating, generally to a temperature of about 90° C. to 160° C., but sometimes higher, depending on the softening range of the particular resin used in the toner. It is not desirable, however, to exceed a temperature of about 200° C. because of the tendency of the receiver to discolor at such elevated temperatures, particularly if it includes a paper substrate.

Several approaches to thermal fusing of toner images have been described in the prior art, including the substantially concurrent application of heat and pressure substantially concurrently. This may be achieved by, for example, a pair of rollers, a fuser roller and a pressure roller that are maintained in pressure contact, a fuser plate or belt member in pressure contact with a pressure roller, and the like. Heat may be applied to one or both of the rolls, plates, or belts. The fusing of the toner particles takes place when the proper combination of heat, pressure and contact time are provided. The balancing of these parameters to bring about the fusing of the toner particles is well known in the art and can be adjusted to suit particular machines or process conditions.

During operation of a fusing system in which heat is applied to cause thermal fusing of the toner particles onto a support, both the toner image and the receiver are passed through a nip formed between the roller pair, or between the pressure roller and fuser plate or belt member. The concurrent transfer of heat and the application of pressure in the nip effects the fusing of the toner image onto the receiver. It is important in the fusing process that no offset of the toner particles from the support to the fuser member take place during normal operations. Toner particles offset onto the fuser member may subsequently transfer to other parts of the machine or onto the receiver in subsequent copying cycles, thereby increasing the background or interfering with the material being copied there. "Hot offset" occurs when the temperature of the toner is raised to a point where the toner particles liquefy during the fusing operation, and a portion of the molten toner remains on the fuser member. The extent of hot offset is a measure of the release property of the fuser roll; accordingly, it is desirable to provide a fusing surface having a low surface energy to enable the necessary release.

For further improvement in the release properties of the fuser member, it is customary to apply release agents to the fuser member surface to ensure that the toner is completely released from the surface during the fusing operation. Typically, release agents for preventing toner offset are applied as thin films of, for example, silicone oils. U.S. Pat. No. 3,810,776 describes a release agent of a low viscosity silicone oil in which is dispersed a high viscosity component such as zinc or aluminum stearate or behenate. Polyorganosiloxanes containing various functional groups that interact with a fuser member surface are well known in the art. For example, mercapto-functionalized polyorganosiloxanes are disclosed in U.S. Pat. No. 4,029,827, and analogous amino-functionalized materials are described in U.S. Pat. Nos. 5,512,409 and 5,516,361. Silicone release oils containing other functional groups such as carboxy, hydroxy, epoxy, and isocyanate are described in U.S. Pat. Nos. 4,101,686 and 4,185,140.

In a fusing system comprising a nip formed by a pair of rollers, the pressure roller is commonly provided with a surface layer, or sleeve, of a fluorocarbon plastic such as, for example, a perfluoroalkoxy (PFA) polymer, a fluoroethylenepropylene (FEP) polymer, or a tetrafluoroethylene (TFE) polymer over a more resilient blanket layer such as, for example, a silicone rubber. The surface of the fuser roller, which is often but not necessarily more resilient than the pressure roller surface, may comprise, for example, a silicone rubber or a fluoroelastomer.

Regardless of the materials employed, contact between the roller surfaces during passage of a toner image receiver, usually paper, through the nip causes a triboelectric charge to build up on the fuser roller surface. The magnitude and polarity of the triboelectric charge depends at least in part on the relative position of the pressure and fuser roller surface materials in the triboelectric series. In L. B. Schein, *Electrophotography and Development Physics*, 2nd edition, Springer-Verlag, New York, 1992, page 78, is presented a triboelectric series table showing a silicone elastomer with silica filler at the extreme positive end of the series and polytetrafluoroethylene at the extreme negative end.

Generation of a triboelectric charge at the roller nip may, depending on the magnitude and polarity of the charge on the fuser roller surface and the surface charge properties of the toner composition particles employed, result in serious problems of toner offset or paper jamming, or both. It is therefore desirable to prevent or suppress the buildup of static charge at the nip to keep it at a very low level, ideally zero.

U.S. Pat. No. 4,970,559, the disclosure of which is incorporated herein by reference, describes a mixture for forming a roller layer that comprises an organic polymer and an inorganic fine powder carrying an absorbed liquid antistatic agent. In order to maintain flexibility in the choice of materials for the pressure and fuser roller surfaces, however, it would be desirable to employ a toner release agent that could be applied to the roller surfaces in a manner effective to prevent or suppress the formation of triboelectric charge during the fusing process. Unfortunately, some commonly employed release agents cause a substantial increase in static charge on the roller surfaces. The novel release agent compositions of the present invention provide an effective solution to the problem of static charge buildup on the surfaces of the pressure and fuser rollers.

SUMMARY OF THE INVENTION

In accordance with the invention, a toner release agent composition for electrostatography comprises a polydialkylsiloxane oil and a concentration of a nonionic surfactant that is effective to prevent or substantially suppress triboelectric charging of pressure and fuser members during fusion of thermoplastic toner on a receiver. The nonionic surfactant preferably comprises about 1 to 10 weight percent, more preferably about 2 to 5 weight percent, of the release agent composition.

By preventing or substantially suppressing triboelectric charging of a fuser roller surface, the toner release agent compositions of the present invention provide more trouble-free copier machine performance and improved copy quality.

DETAILED DESCRIPTION OF THE INVENTION

The toner release agent composition of the present invention comprises a polydialkylsiloxane oil and a nonionic surfactant. The polydialkylsiloxane oil can be non-functionalized, or it can include a functional group such as, for example, a mercapto, amino, or hydrosilyl group. The polyalkyldisiloxane oil is preferably a polydimethylsiloxane fluid having a viscosity of about 50 cSt to 200,000 cSt, more preferably about 100 cSt to 1000 cSt, at 25° C. Useful dimethylsiloxane fluids are available from various commercial sources, for example, Dow Corning Co. and United Chemical Co..

The nonionic surfactant, which is included in the release agent composition in a concentration of preferably about 1 to 10 weight percent, more preferably about 2 to 5 weight percent, is selected from the group consisting of a silicone glycol polymer, a perfluoroalkylsubstituted polyethylene glycol, and a perfluoroalkylsubstituted silane.

Silicone glycol polymeric surfactants, which preferably comprise about 20 to 70 weight percent ethylene oxide units and have a viscosity of about 1000 cSt to 2000 cSt at 25° C., are of the general structure

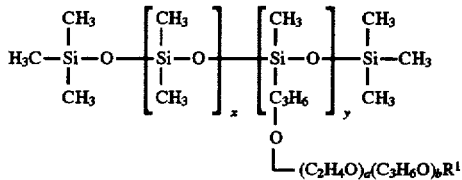

where $R^1$ is hydrogen or a lower alkyl group, x denotes zero or a positive integer, y denotes a positive integer, and a and b each denotes zero or a positive integer, with the proviso that a and b cannot both be zero. Commercially available silicone glycol polymeric surfactants include, for example, SILWET™ copolymers such as SILWET™ L-7002 from Union Carbide Co. and Dow Corning™ 190 surfactant from Dow Corning Co.

Suitable perfluoroalkylsubstituted polyethylene glycol surfactants have the structure $$F(CF_2)_m CH_2 CH_2 (CH_2 CH_2 O)_n H$$

where m and n each denotes a positive integer, m being a positive integer preferably from about 3 to 10. Commercially available surfactants of this type include, for example, ZONYL™ FSN-100 and FSO-100 fluorosurfactants, manufactured by DuPont.

Perfluoroalkylsubstituted silane surfactants useful for the practice of the invention have the structure $$F(CF_2)_r CH_2 CH_2 Z^1 Z^2 Z^3$$

where r denotes a positive integer preferably from about 3 to 10, and $Z^1$, $Z^2$, and $Z^3$ each individually represents hydrogen, a halo substituent, or a lower alkyl or alkoxy group. In more preferred embodiments, r is about 5 to 8, and at least one of $Z^1$, $Z^2$, and $Z^3$ represents a halo substituent or an alkoxy group containing 1 to about 4 carbon atoms. In an especially preferred embodiment, $Z^1$, $Z^2$, and $Z^3$ each represents an ethoxy group. Commercially available perfluoroalkylsubstituted silane surfactants include, for example, PCR 12401-6 surfactant from PCR Co. and T-2491 surfactant from United Chemical Co.

EXAMPLES

The following examples further illustrate the invention:

Example 1-Measurement of triboelectric charge generation in polymeric materials

The triboelectric charging characteristics of several polymeric materials useful in the surface layer of fuser members were measured by the following procedure:

A molded slab having a thickness of about 75 mils (1900μ) was prepared from each polymeric material and cut into samples approximately 2 inches (5 cm) square. The samples were cleaned with alcohol and placed in an ionizing air blower (No. 4003367 from Simco Inc.) for 1 minute prior to testing. Each sample was rubbed by an operator wearing vinyl gloves back and forth 20 times against a test pressure roller of 33 cm length and 5 cm outside diameter and comprising a silicone rubber blanket and a perfluoroalkoxy (PFA) polymeric sleeve. The triboelectric charge generated on the sample surface was then measured using a Model 230 nanocoulombmeter and a Model 231 Faraday cup, manufactured by Electro-tech Systems, Inc.

The following polymeric materials were included in the test:

(1) silicone robber EC-4952 from Emerson Cuming
(2) silicone robber Silastic™ E from Dow Coming
(3) fluorolatex FLC from Daikin KK, Japan
(4) Supra™ blend of PTFE and PFA fluoropolymers from DuPont
(5) Fluorel™ FX 2530 fluorelastomer from 3M
(6) Fluorel™ FX 2530 fluoroelastomer containing 20 weight percent Vydax™ AR/IPA resin from DuPont, as described in Example 1 of U.S. Pat. No. 5,599,631, the disclosure of which is incorporated herein by reference
(7) an interpenetrating network (IPN) as described in Example 1 of U.S. Pat. No. 5,582,917, the disclosure of which is incorporated herein by reference, that includes 1 part SFR-100 silicone from General Electric Co. but includes 5 parts Fluorel™ FX 9038 fluorelastomer in place of Vyton™ A fluoropolymer.

In TABLE 1 below are listed the measured static charge values in nanocoulombs for materials (1)–(7), obtained by rubbing each sample against the same roller. The observed values vary over a wide range, from −16.0 nanocoulombs for fluoroelastomer (5) to about +20 nanocoulombs for silicone rubbers (1) and (2), and even further to +41.8 nanocoulombs for interpenetrating network (7).

TABLE 1

| Sample | Static charge (nanocoulombs) |
| --- | --- |
| (1) | +20.0 |
| (2) | +21.5 |
| (3) | +5.7 |
| (4) | +5.6 |
| (5) | −16.0 |
| (6) | −12.5 |
| (7) | +41.8 |

Example 2-Effect of surfactant-containing release agents on triboelectric charge generation in polymeric materials.

The following release agent compositions of the invention, each comprising Dow Corning™ 200 350-cSt viscosity PDMS fluid and 2 weight percent of a nonionic surfactant, were prepared:

(A) PDMS containing 2 weight percent ZONYL™ FSN-100 fluorosurfactant (B) PDMS containing 2 weight percent ZONYL™ FSO-100 fluorosurfactant (C) PDMS containing 2 weight percent PCR 12401-6 perfluoroalkylsubstituted silane surfactant.

The PDMS fluid containing no surfactant, designated agent (X), was used as a control.

Molded slabs having a thickness of about 75 mils (1900µ) of the following compositions were prepared:

(P-1) 100 parts by weight Fluorel™ FE5840Q fluoroelastomer containing 10 parts by weight CuO (P-2) 100 parts by weight Fluorel™ FX9038 fluoroelastomer containing 10 parts by weight CuO (P-3) Fluorel™ FX9038 containing 25 volume percent $Al_2O_3$ (P-4) 100 parts by weight Viton™ fluoropolymer containing 3 parts by weight CuO.

The same pressure roller and test procedure as described in Example 1 were employed, except that the samples were each about 1 inch (2.5 cm) square and were rubbed back and forth 15 times against the pressure roller. The release agents of the composition, (A), (B), and (C), as well as control agent (X) were each applied evenly to the pressure roller surface using a pad moistened with the agents. Measurements were also made with no oil applied to the roller. The results of the triboelectric charge measurements are summarized in TABLE 2 below.

TABLE 2

| Release Agent | Static charge (nanocoulombs) | | | |
| --- | --- | --- | --- | --- |
| | (P-1) | (P-2) | (P-3) | (P-4) |
| None | −8.5 | −6.8 | −8.3 | +5.3 |
| (X) Control | −0.9 | −3.4 | +2.4 | −1.0 |
| (A) Invention | −0.4 | −0.1 | −0.3 | −0.4 |
| (B) Invention | −0.1 | −0.5 | −1.2 | −0.1 |
| (C) Invention | 0 | 0 | 0 | 0 |

As shown by the entries in TABLE 2, the use of control release agent (X) containing no surfactant markedly decreased static charge generation on the rubbed sample surface, as compared to the use of no release agent. Employing release agent compositions (A), (B), and (C) of the invention in place of control (X) resulted in further substantial reductions in triboelectric charging. In particular, the application to the pressure roller surface of release agent (C), which included the perfluoroalkylsubstituted silane PCR 12401-6 surfactant, completely prevented charge buildup on all four of the sample compositions tested.

Example 3-Effect of silicone glycol surfactant on triboelectric charging

A composition of Viton™ A fluoropolymer containing 20 weight percent Vydax™ AR/IPA resin, prepared as described in the previously mentioned U.S. Pat. No. 5,599,631, was molded into a 75 mil (1900µ)-thick slab, which was cut into samples about 2 inches (5 cm) square. Triboelectric charging measurements were made, using the same roller, apparatus, and procedure as described in Example 1, under the following test conditions:

no release agent applied to the roller surface;

60,000 cSt-viscosity PDMS fluid applied to the roller surface;

SILWET™ L-7002 silicone glycol surfactant applied to the roller surface;

a release agent composition of the invention comprising 2 weight percent SILWET™ surfactant in the 60,000 cSt-viscosity PDMS fluid applied to the roller surface.

The results of the triboelectric charge measurements are given in TABLE 3 below.

TABLE 3

| Release Agent | Static charge (nanocoulombs) |
| --- | --- |
| None | −12.5 |
| 60,000 cSt-PDMS (control) | −36 |
| SILWET ™ L-7002 (control) | +0.1 |
| 60,000 cSt-PDMS + 2 wt. % SILWET ™ L-7002 (Invention) | +0.4 |

As shown by the data in TABLE 3, use of the high viscosity PDMS fluid greatly increased the static charge, to −36 nanocoulombs, from the no applied agent condition, where the measured charge was −12.5 nanocoulombs. Use of neat SILWET™ L-7002 surfactant as the release agent reduced the charge substantially to zero, but this is not a practical solution to the problem of charge buildup. Most remarkable and unexpected was the discovery by the applicants that the inclusion of only 2 weight percent SILWET™ L-7002 surfactant in the high viscosity PDMS fluid to form a release agent composition of the invention was almost as effective as the neat surfactant, reducing the charge to +0.4 nanocoulombs from the extreme of −36 nanocoulombs.

The invention has been described in detail with particular reference to preferred embodiments thereof, but it will be understood that variations and modifications can be effected within the spirit and scope of the invention.

What is claimed is:

1. A toner release agent composition for electrostatography comprising a polydialkylsiloxane oil and an effective amount of a nonionic surfactant, said nonionic surfactant being effective to prevent or substantially suppress triboelectric charging of pressure and fuser members during fusion of thermoplastic toner on a receiver wherein said nonionic surfactant is selected from the group consisting of a silicone glycol polymer, a perfluoroalkylsubstituted polyethylene glycol, and a perfluoroalkylsubstituted silane.

2. The release agent composition of claim 1 wherein said nonionic surfactant comprises about 1 to 10 weight percent of said release agent composition.

3. The release agent composition of claim 2 wherein said surfactant comprises about 2 to 5 weight percent of said release agent composition.

4. The release agent composition of claim 1 wherein said polydialkylsiloxane oil comprises a polydimethylsiloxane fluid having a viscosity of about 50 cSt to 200,000 cSt at 25° C.

5. The release agent composition of claim 4 wherein said viscosity is about 100 cSt to 1000 cSt at 25° C.

6. The release agent composition of claim 1 wherein said polydialkylsiloxane oil includes a functional group.

7. The release agent composition of claim 1 wherein said silicone glycol polymer has the structure

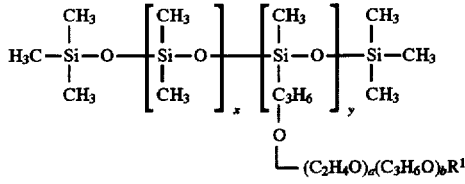

wherein $R^1$ is hydrogen or a lower alkyl group, x denotes zero or a positive integer, y denotes a positive integer, and a and b each denotes zero or a positive integer, with the proviso that a and b cannot both be zero.

8. The release agent composition of claim 7 wherein said silicone glycol polymer comprises about 20 to 70 weight percent ethylene oxide units.

9. The release agent composition of claim 7 wherein said silicone glycol polymer has a viscosity of about 1000 cSt to 2000 cSt at 25° C.

10. The release agent composition of claim 1 wherein said perfluoroalkylsubstituted polyethylene glycol has the structure

wherein m and n each denotes a positive integer, m being a positive integer from about 3 to 10.

11. The release agent composition of claim 1 wherein said perfluoroalkylsubstituted silane has the structure

wherein r denotes a positive integer from about 3 to 10, and $Z^1$, $Z^2$, and $Z^3$ each individually represents hydrogen, a halo substituent, or a lower alkyl or alkoxy group.

12. The release agent composition of claim 11 wherein r is about 5 to 8 and at least one of $Z^1$, $Z^2$, and $Z^3$ represents a chloro substituent.

13. The release agent composition of claim 11 wherein r is about 5 to 8 and at least one of $Z^1$, $Z^2$, and $Z^3$ represents an alkoxy group containing 1 to about 4 carbon atoms.

14. The release agent composition of claim 13 wherein $Z^1$, $Z^2$, and $Z^3$ each represents an ethoxy group.

* * * * *